United States Patent
Willard

(10) Patent No.: US 7,570,423 B2
(45) Date of Patent: Aug. 4, 2009

(54) PROJECTION SCREEN

(75) Inventor: Randall Orson Willard, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/698,580

(22) Filed: Jan. 25, 2007

(65) Prior Publication Data

US 2008/0180796 A1    Jul. 31, 2008

(51) Int. Cl.
    *G03B 21/60* (2006.01)
(52) U.S. Cl. ...................................... 359/459
(58) Field of Classification Search ................. 359/454, 359/455, 456, 459, 443
    See application file for complete search history.

(56) References Cited

U.S. PATENT DOCUMENTS

| | | | |
|---|---|---|---|
| 3,191,495 A * | 6/1965 | Miller | 359/455 |
| 3,462,214 A * | 8/1969 | Glenn, Jr. | 353/38 |
| 3,966,301 A * | 6/1976 | Brown | 359/455 |
| 5,416,617 A | 5/1995 | Loiseaux et al. | |
| 5,747,225 A | 5/1998 | Manico et al. | |
| 6,160,655 A | 12/2000 | Fix et al. | |
| 6,538,814 B2 | 3/2003 | Hunter et al. | |
| 6,609,799 B1 * | 8/2003 | Myers | 359/613 |
| 6,700,702 B2 * | 3/2004 | Sales | 359/443 |
| 6,788,460 B2 | 9/2004 | Knox et al. | |
| 7,110,176 B2 * | 9/2006 | Maruta et al. | 359/459 |
| 2003/0137728 A1 * | 7/2003 | Kuroda et al. | 359/455 |
| 2005/0168813 A1 | 8/2005 | Benning et al. | |
| 2006/0028721 A1 | 2/2006 | Smythe et al. | |
| 2006/0103932 A1 | 5/2006 | Relke et al. | |
| 2007/0217004 A1 * | 9/2007 | Smith et al. | 359/456 |

FOREIGN PATENT DOCUMENTS

| | | |
|---|---|---|
| GB | 1 236 424 | 6/1971 |
| JP | 5197021 | 8/1993 |
| JP | 2005-241920 A | 9/2005 |

* cited by examiner

*Primary Examiner*—Christopher Mahoney

(57) ABSTRACT

A projection screen (10) includes a plurality of asperities (14) extending from a substrate, the asperities having faces oriented in a plurality of directions. A photosensitive material is disposed preferentially on the faces so that a differing amount of photosensitive material is present on faces oriented generally toward a projector direction (16) relative to faces oriented generally away from the projector direction (18).

10 Claims, 2 Drawing Sheets

PROJECTION SCREEN

BACKGROUND

Videoconference systems, home theatres, and other situations often use reflective screens for the projection of images thereon. Reflection of ambient light tends to reduce the contrast available with these screens. For example, when ambient light is reflected from the screen, this reduces the darkest level available in projected images. If a large amount of ambient light is reflected from the screen, contrast of the projected images is reduced. Some screens are gray in color to help reduce ambient light reflection, but this represents a compromise, as the gray also reflects less of the projected light. Accordingly, screens that reflect less ambient light while still providing high reflectivity for projected images are desired.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

Figure 1:
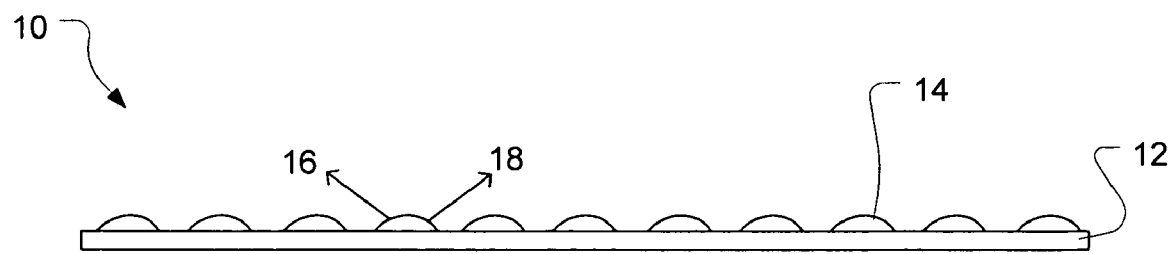
FIG. 1 is side view of a projection screen in accordance with an embodiment of the present invention.

In describing embodiments of the present invention, the following terminology will be used.

The singular forms "a," "an," and "the" include plural referents unless the context clearly dictates otherwise. Thus, for example, reference to "a component surface" includes reference to one or more of such cameras.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Reference will now be made to the exemplary embodiments illustrated, and specific language will be used herein to describe the same. It will nevertheless be understood that no limitation of the scope of the invention is thereby intended.

One technique to improve the contrast of projected images is a reflective screen geometry which reflects light coming from a projector from one direction differently than ambient light which comes from other directions. For example, the surface of the screen can provide a textured or otherwise non-planar surface, such as a series of protrusions or indentations, referred to generally as asperities. The asperities can have multiple surfaces or faces oriented towards different directions, generally at an angle relative to the plane of the screen. The surfaces of the asperities can have material of differing reflectivity applied to the faces depending on the orientation of the faces. For example, highly reflective material can be applied to asperity faces oriented generally toward a projection source to reflect light from a projector. Low reflectivity material can be applied to asperity faces oriented generally away from the projection direction to absorb ambient light from various directions. A photosensitive material can also be included to allow the reflectivity to vary as a function of ambient lighting conditions. Accordingly, the reflective screen can provide directional selectivity of the absorption and reflection of light which varies as a function of ambient light level. By generally reflecting projected light from the projector direction while absorbing ambient light from other directions, contrast of projected images can be improved or maintained over a range of ambient light levels.

Accordingly, one embodiment of the present invention is a projection screen as illustrated in FIG. 1. The screen, shown generally at 10, includes a substrate 12 having a plurality of asperities 14 extending from the substrate. The asperities have faces oriented in a plurality of directions 16, 18. For example, a projector direction 16 can be oriented generally towards a projector. A differing amount of photosensitive material is present on faces 18 oriented generally toward the projector direction relative to faces oriented away from the projector direction.

In general, the photosensitive material allows the reflectivity of the screen to be varied differently for faces oriented generally toward the projection source relative to faces oriented generally away from the projection source. The photosensitive material can be responsive to ambient light. For example, as ambient light increases, portions facing away from the projector can be darkened, portions facing toward the projector can be lighted, or both. High contrast is therefore maintained for the screen over varying ambient light conditions.

Figure 2:
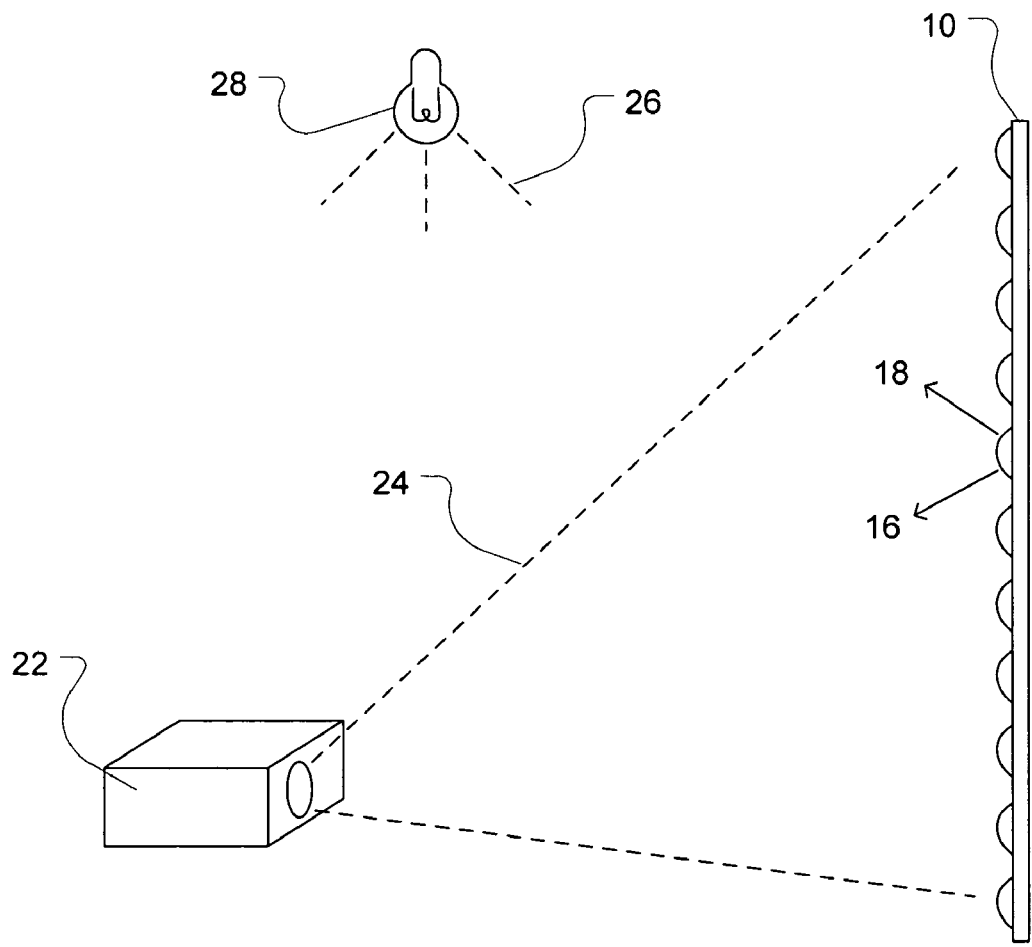
FIG. 2 is a schematic illustrating use of a projection screen in accordance with an embodiment of the present invention.

Operation of the screen will become more apparent from FIG. 2 which shows a screen being used for projection in accordance with an embodiment of the present invention. A projection source 22 projects light 24 toward the screen 10 from the projector direction 16 to form images on the screen. As an example, the projector direction can be within a range of about 5 degrees to about 45 degrees from perpendicular relative to the screen, allowing the projected light to fall on the projector direction facing faces of the asperities 14. Ambient light 26 may shine onto the screen from one or more other directions 18. For example, ambient light may be provided primarily from overhead illumination sources 28.

Because at least portions of the screen surface are coated with a photosensitive material, the screen reflectivity is able to dynamically vary in response to the amount of ambient light. Generally, photo-darkening materials can be placed on surfaces facing towards sources of ambient light, photo-lightening materials can be placed on surface facing towards sources of projection light, or both. One benefit of photosensitive materials it that the reflectivity can be varied depending on the room lighting conditions. Static reflective or absorptive materials, however, tend to provide a constant reflectivity.

It should be appreciated that the faces need not be precisely aligned in any particular directions. In other words, faces which are generally oriented in the projector direction may include faces angled relative to the projector direction. For example, faces oriented generally toward the projector direction may include faces which have surfaces which face anywhere between about 0 degrees (facing straight on) to about 90 degrees (perpendicular) relative to the projector direction. These faces will reflect projected light incident thereon in various directions. The inclusion of a range of different direction facing faces can help to provide for wider angular dispersion of the projected light, helping to provide a wide viewing angle and reducing hot spot effects. For example, the asperities may be irregular in shape and placement, helping to provide a diffusive effect to reflections from the screen.

In one embodiment, the photosensitive material can be a photo-darkening material which is placed preferentially on the faces oriented generally away from the projector direction. Faces oriented toward the projector direction can have a highly reflective material (e.g., aluminum, silver, white pigment, and the like or mixtures thereof, photo-lightening material, or mixture of both). As the ambient light level increases, the faces oriented generally away from the projector direction respond to the ambient light by becoming less reflective. Less ambient light is reflected, resulting in a darker appearance, helping to maintain high contrast for the screen even in the presence of high ambient light levels. As the ambient light level is reduced, the photo-darkening material on the non-projector facing faces becomes lighter (more reflective), making it closer in color and appearance to the material on the projector facing faces. This results in a more uniform screen appearance at low light levels, helping to reduce the visibility of patterns in the screen formed by differences between the reflectivity of faces having different materials deposited thereon.

In another embodiment, the photosensitive material can be a photo-lightening material which is placed preferentially on the faces oriented generally toward the projector direction. Other faces can have a highly absorptive material (e.g., carbon black, black pigment, and the like or mixtures thereof. As the ambient light level increases, the faces oriented generally toward the projector direction respond to the ambient light by becoming more reflective. This in turn increases the amount of reflected projection light, helping to increase the brightness of the image as the ambient light levels increase.

Various photosensitive materials can be used in embodiments of the present invention. Light may trigger a chemical reaction which causes a color, reflectivity, or other optical change in the material. The photosensitive material may be responsive to visible, ultraviolet, or infrared light. For example, materials responsive to ultraviolet light can prove helpful for screens used in an outdoor environment, as the high ultraviolet content of sunlight can cause the screen reflectivity to vary automatically depending on the amount of sunlight present. Exemplary photosensitive materials include spirooxazine, naphthopyran, chromene, spiroindolinonapthoxazine, and the like.

Various coating formulations may be used, depending on the application, including for example, formulations consisting essentially entirely of a photosensitive material, a combination of photosensitive materials, a mixture of photosensitive material(s) and other additives such as pigments or particles designed to affect or control the optical properties of the material. Formulations may also include a liquid vehicle and surfactant, or both. A liquid vehicle or surfactant can help in dispensing and depositing the coating formulation, for example, using ink-jet printing. Liquid vehicles can include, for example, water, water-soluble polyvinyl alcohol, cellulose acetate, polymethyl acrylate, or other liquid vehicle components as are generally know in the printing arts. The surfactant can include, for example, polyethylene glycols, glycerine esters, ethoxylated fatty amines, alkyl phenol ethoxylates, sorbitan esters, PEG fatty acid esters, ethoxylated sorbitan esters, ethoxylated alcohols, linear alcohol ethoxylates, sodium dodecylsulfate, sodium deoxychlorate, N-Lauroylsarcosine sodium salt, cetyltrimethylammonium bromide, ammonium citrate, combinations thereof, or other surfactants as generally known in the printing arts.

Various ways of making a projection screen in accordance with embodiments of the present invention are possible. For example, the screen can be fabricated on a screen substrate. The substrate may be formed of plastic (e.g., polyvinyl chloride, polypropylene, polyethylene terephthalate), fabric, woven materials, or other materials.

A plurality of asperities can be defined to extend from the substrate so that faces of the asperities point in various directions. For example, the asperities can be defined on the substrate by embossing, photolithography, abrasion, chemical or laser etching, or other techniques. As another example, the asperities can be provided by the substrate material, for example, by using a woven material. As yet another example, the asperities can be defined by depositing particles onto the substrate.

Figure 3:
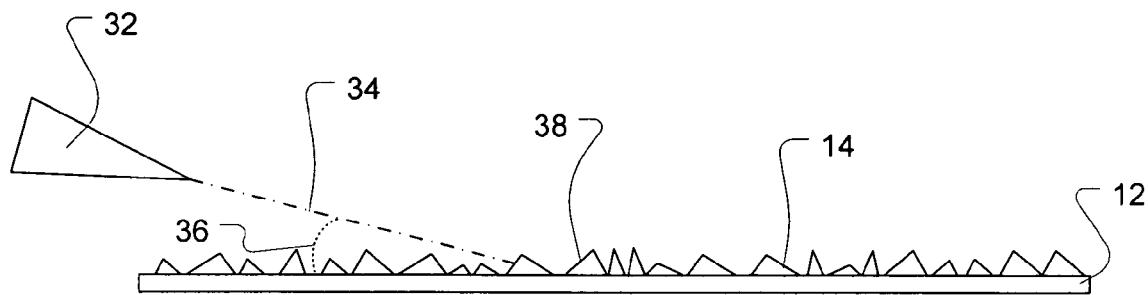
FIG. 3 is a schematic illustrating one method of making of projection screen in accordance with an embodiment of the present invention.

Fabrication can include depositing a photosensitive material on the faces of the asperities so that a differing amount of photosensitive material is present on different direction facing faces. Material may be deposited using a technique which allows for directional deposition, such as vapor deposition, spraying, coating, jetting, or the like. For example, as illustrated in FIG. 3 in accordance with an embodiment of the invention, a jetting source 32 can deposit a photosensitive material 34 at an oblique angle 36 onto faces 38 of the plurality of asperities. For example, the oblique angle may correspond to a direction from which projected light is received or a direction from which ambient light is received. By jetting the photosensitive material from an oblique angle, the photosensitive material will primarily be deposited on surfaces facing toward the jetting source.

Figure 4:
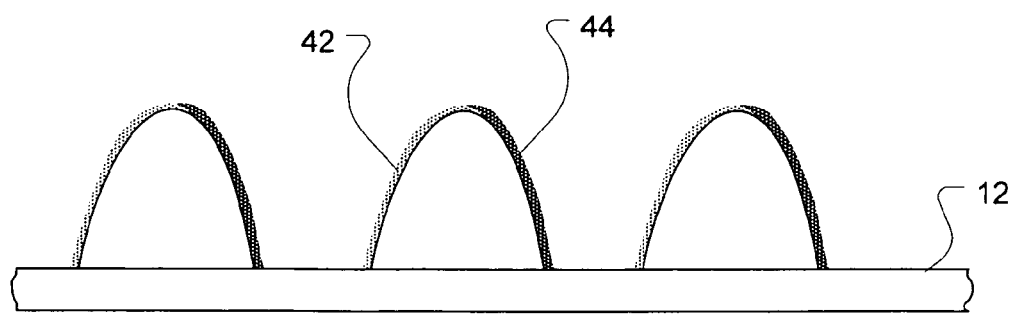
FIG. 4 is a detailed side view of a portion of a projection screen in accordance with an embodiment of the present invention.

Material may be applied from one or more directions, and different materials may be applied from different directions. For example, as illustrated in FIG. 4 in accordance with an embodiment of the present invention, two or more types of materials may be applied to the asperities from different directions. For example, a first material 42 may be jetted from a first direction and a second material 44 may be jetted from a second direction. The first material may be, for example, a highly reflective material. The second material may be a highly absorptive material, photo-darkening material, or mixture of both.

As a specific example, photo-darkening material may be jetted at an oblique angle from the top and sides of the screen and photo-lightening material may be jetted at an oblique angle from the bottom of the screen. This provides for photo-darkening material to be applied primarily to faces oriented generally away from the projector direction and provides for photo-lightening material to be applied primarily to faces oriented generally toward the projector direction. In such a case, ambient light coming from above and from the sides of the screen will be absorbed, while projected light coming from below will be reflected.

As another example, the screen can include a substrate which is coated with a highly absorptive material. For example, the substrate may include black pigments, particle coated fabrics such as silicon-carbide emory paper, thin film coated absorbers (e.g., silicon carbide, aluminum nitride, titanium nitride), or optical structures designed for high absorption. Photo-darkening material can be applied from a first direction, which corresponds to an upward direction when the screen is put into use. Highly reflective material can be applied from a second direction, which corresponds to a downward direction when the screen is put into use. The highly reflective material provides high brightness reflection of projected light from the projector. The photo-darkening material helps to absorb ambient light coming from overhead lighting in the room in which the screen is mounted. Because the photo-darkening material gets darker as ambient light increases, the photo-darkening material helps to maintain contrast.

Various types of materials and their ordering of application can be used. For example, in one embodiment, a highly reflective material may be coated over all of the faces of the asperities, and then a photo-darkening material applied to faces oriented in one or more directions which face primarily toward ambient light sources. In another embodiment, photo-darkening material may be coated over all of the faces of the asperities, and then a highly reflective material may be applied to faces oriented in one direction which faces primarily toward the projection light source. In another embodiment, a highly absorptive material may be coated over all of the faces of the asperities, and then a photo-lightening material applied to faces oriented in one direction which faces primarily toward the projection light source. In another embodiment, a photo-lightening material may be applied to all of the faces of the asperities, and then a highly absorptive material may be applied to faces oriented in one or more directions which face primarily toward ambient light sources. Many other combinations of coating materials and their order of application which can be used will be apparent from the above.

It will be appreciated that the dimensions of the asperities, types of photosensitive material, number of photosensitive materials, other coatings, dimension of the screen, and other parameters may be varied depending on the particular application. For example, in one embodiment, the photosensitive material may be applied at an oblique angle of about 5 to about 45 degrees relative to perpendicular. This can correspond to a projector direction. In another embodiment, the photosensitive material may be applied from a side of the screen, for example, corresponding to a direction toward a window which provides high levels of ambient light.

Various geometries for the asperities can be used. For example, the asperities can be uniformly or irregularly shaped. The height, slope of sides, profile, and other aspects of the asperities can be varied to provide desired screen characteristics for particular applications. Generally, the dimensions of the asperities may be large relative to the wavelength of visible light to help avoid diffraction and interference effects, while small enough to help avoid pixilation or sparkle. Accordingly, in one embodiment, the asperities can have sizes in the range of about 4 microns to about 500 microns. Generally, when the distance from the screen to a viewer is larger, larger asperities can be used without resulting in undesirable pixilation or sparkle.

Summarizing and reiterating to some extent, the differential coating of photosensitive materials onto various faces of a rough screen surface can help to provide a screen which enhances contrast of projected images. Reflectivity of portions of the screen surface can be varied differently in response to ambient light. Portions of the screen facing primarily toward ambient light can be darkened automatically as ambient light levels increase, reducing the amount of ambient light reflected.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A projection screen comprising:
    a substrate;
    a plurality of asperities extending from the substrate, the asperities having faces oriented in a plurality of directions;
    a first material having a first reflectivity disposed preferentially on the faces oriented generally toward a projector direction; and
    a second material having a second reflectivity disposed preferentially on the faces oriented generally away from the projector direction,
    wherein at least one of the first and second materials is a photosensitive material having a reflectivity that varies in response to ambient light.

2. The projection screen of claim 1, wherein the second material is a photo-darkening material responsive to ambient light.

3. The projection screen of claim 1, wherein the first material is a photo-lightening material responsive to ambient light.

4. The projection screen of claim 1, wherein the photosensitive material is chosen from the group of photosensitive materials consisting of spirooxazine, naphthopyran, chromene, spiroindolinonapthoxazine and combinations thereof.

5. The projection screen of claim 1, wherein the projector direction is within a range of about 5 degrees to about 45 degrees from perpendicular relative to the substrate.

6. A method of making a projection screen comprising:
    providing a screen substrate;
    defining a plurality of asperities extending from the substrate, the asperities having faces oriented in a plurality of directions; and
    applying a first material having a first reflectivity preferentially to the faces oriented generally toward a projector direction; and
    applying a second material having a second reflectivity preferentially to the faces oriented generally away from the projector direction,
    wherein at least one of the first and second materials is a photosensitive material having a reflectivity that varies in response to ambient light.

7. The method of claim 6 wherein applying the photosensitive material comprises jetting the photosensitive material at an oblique angle onto the plurality of asperities.

8. The method of claim 6 wherein applying the first material and applying the second material further comprises directionally applying a first photosensitive material and a second photosensitive material of at least two different types from at least two different directions onto the plurality of asperities.

9. The projection screen of claim 6, wherein the projector direction is within a range of about 5 degrees to about 45 degrees from perpendicular relative to the substrate.

10. A method of using a projection screen comprising:
providing a projection screen having a screen surface with a plurality of asperities extending from the substrate, the asperities having faces oriented in a plurality of directions;
projecting an image onto the screen from a projection source; and
using at least one photosensitive material to vary the reflectivity of the faces differently for faces oriented generally toward the projection source relative to faces oriented generally away from the projection source in response to ambient light.

* * * * *